(12) United States Patent
Fischer

(10) Patent No.: US 10,406,766 B2
(45) Date of Patent: Sep. 10, 2019

(54) SYSTEM AND METHOD FOR CONTINUOUSLY PULLING SUBSTRATES THROUGH A COATER

(71) Applicant: Paul Fischer, Oakland, CA (US)

(72) Inventor: Paul Fischer, Oakland, CA (US)

( * ) Notice: Subject to any disclaimer, the term of this patent is extended or adjusted under 35 U.S.C. 154(b) by 73 days.

(21) Appl. No.: 15/359,549

(22) Filed: Nov. 22, 2016

(65) Prior Publication Data
US 2017/0165712 A1 Jun. 15, 2017

Related U.S. Application Data

(60) Provisional application No. 62/258,799, filed on Nov. 23, 2015.

(51) Int. Cl.
*B29D 7/01* (2006.01)
*B26D 1/06* (2006.01)
*B26D 5/00* (2006.01)
*D21H 23/00* (2006.01)
*B65H 20/32* (2006.01)

(52) U.S. Cl.
CPC .............. *B29D 7/01* (2013.01); *B26D 1/065* (2013.01); *B26D 5/00* (2013.01); *B65H 20/32* (2013.01); *D21H 23/00* (2013.01); *B05D 2252/02* (2013.01); *B65H 2301/4491* (2013.01); *B65H 2301/5114* (2013.01); *B65H 2301/5151* (2013.01)

(58) Field of Classification Search
CPC . B29D 7/01; B26D 1/065; B26D 5/00; D21H 23/00; B05D 2252/02
USPC ........................................... 427/289
See application file for complete search history.

(56) References Cited

U.S. PATENT DOCUMENTS

| | | | |
|---|---|---|---|
| 2002/0084302 A1* | 7/2002 | Holbrook | B65H 20/22 226/43 |
| 2014/0048640 A1* | 2/2014 | Harter | B65H 35/08 242/419.8 |
| 2017/0165712 A1* | 6/2017 | Fischer | B29D 7/01 |

\* cited by examiner

*Primary Examiner* — Kelly M Gambetta
(74) *Attorney, Agent, or Firm* — Kaplan Breyer Schwarz, LLP

(57) ABSTRACT

A system and method is provided that allows for the non-interrupted coating of a pulled substrate with coating materials, even while a coated portion of the substrate is held stationary for cutting. The present invention eliminates waste and improves efficiency and yield, and is particularly applicable to laboratory drawdown coaters.

24 Claims, 4 Drawing Sheets

SYSTEM AND METHOD FOR CONTINUOUSLY PULLING SUBSTRATES THROUGH A COATER

This application claims priority to U.S. Provisional Application Ser. No. 62/258,799 filed Nov. 23, 2015, whose entire disclosure is incorporated herein by reference.

BACKGROUND OF THE INVENTION

1. Field of the Invention

The present invention relates generally to substrate coaters and, more particularly, to a system and method that allows for the continuous pulling of substrates through a coater, even while a coated portion of the substrate is held stationery for cutting.

2. Background of the Related Art

Coating of substrates in an industrial setting is typically accomplished via the use of coaters, such as drawdown coaters. Such devices allow for the application of coating materials, such as emulsions and solvents, to a sheet of substrate, such as film and paper substrates. Examples of coatings that can be applied to a substrate with a drawdown coater include, but are not limited to any viscous or semi viscous liquid that can be formed into a sheet substrate for medical, industrial, scientific, photographic, artistic, or nutritional purposes.

One common type of coating technique employed is referred to as the "knife-over-roll" coating method. This method relies on a wet coating being applied to a substrate, which then passes through a "gap" between a "knife" and a support roller. As the coating and substrate pass through, the excess is scraped off.

In a production environment, pulling tens or hundreds of feet of substrate at a time from a roll stock requires periodic cutting of the material. During the pause to cut the substrate, an interruption of the coating occurs that results in a line across the casting or coated substrate. Because the coating is thinner at this line and because it is also visually inconsistent with the rest of the coating, the section of substrate having the line is considered unusable for sale, or at least cannot be marketed at the same value.

In addition to the cosmetic anomaly, any coated product of a medicinal nature would exhibit an inconsistent dose. Trimming by hand, which is currently done, results in further loss due to lack of necessary precision, requiring re-cutting of the same ends to square off.

SUMMARY OF THE INVENTION

An object of the invention is to solve at least the above problems and/or disadvantages and to provide at least the advantages described hereinafter.

Therefore, an object of the present invention is to provide a system and method that allows for the non-interrupted coating of a pulled substrate even while a coated portion of the substrate is held stationary for cutting.

Another object of the present invention is to provide a system and method that allows for the pulling of a substrate through a coater while a coated portion of the substrate is held stationary while it is being cut.

Another object of the present invention is to provide a system and method that allows for the pulling of a substrate through a laboratory drawdown coater while a coated portion of the substrate is held stationary while it is being cut.

Another object of the present invention is to provide a system and method that utilizes at least two motor rollers that are independently controlled in order to pull a substrate through a coater while a coated portion of the substrate is held stationary while it is being cut.

Another object of the present invention is to provide a system and method that utilizes at least two motor rollers that are independently controlled in order to pull a substrate through a laboratory drawdown coater while a coated portion of the substrate is held stationary while it is being cut.

To achieve at least the above objects, in whole or in part, there is provided a device for continuously pulling a substrate through a coater, comprising a first motor roller positioned to receive a coated substrate from the coater, wherein the first motor roller is adapted to pull the coated substrate in a direction down line from the first motor roller, a second motor roller spaced apart from the first motor roller, and positioned to receive the coated substrate that passed through the first motor roller, wherein the second motor roller is adapted to pull the coated substrate in a direction down line from the second motor roller, a stop sensor positioned and adapted to detect when a predetermined length of coated substrate has been pulled by the first and second motor rollers, and a controller in communication with the first motor roller, the second motor roller and the stop sensor, wherein the controller is configured to stop the second motor roller upon receipt of a signal from the stop sensor indicating that a predetermined length of coated substrate has been pulled by the first and second motor rollers, such that the coated substrate down line from the second motor roller remains stationary for cutting, wherein the controller is further configured to control the first motor roller such that the first motor roller continues to pull the coated substrate from the coater while the second motor roller is stopped, and wherein the controller is further configured to restart the second motor roller after a portion of the coated substrate is cut off.

To achieve at least the above objects, in whole or in part, there is also provided a system for continuously pulling a substrate through a coater, comprising a laboratory drawdown coater, a first motor roller positioned to receive a coated substrate from the laboratory drawdown coater, wherein the first motor roller is adapted to pull the coated substrate in a direction down line from the first motor roller, a second motor roller spaced apart from the first motor roller, and positioned to receive the coated substrate that passed through the first motor roller, wherein the second motor roller is adapted to pull the coated substrate in a direction down line from the second motor roller, a stop sensor positioned and adapted to detect when a predetermined length of coated substrate has been pulled by the first and second motor rollers, and a controller in communication with the first motor roller, the second motor roller and the stop sensor, wherein the controller is configured to stop the second motor roller upon receipt of a signal from the stop sensor indicating that a predetermined length of coated substrate has been pulled by the first and second motor rollers, such that the coated substrate down line from the second motor roller remains stationary for cutting, wherein the controller is further configured to control the first motor roller such that the first motor roller continues to pull the coated substrate from the coater while the second motor roller is stopped, and wherein the controller is further configured to restart the second motor roller after a portion of the coated substrate is cut off.

To achieve at least the above objects, in whole or in part, there is also provided a method continuously pulling a substrate through a coater, comprising pulling an uncoated substrate through a coater at a first pull speed to yield a coated substrate, pulling the coated substrate in a direction down line from the coater, pausing the pulling of a portion of the coated substrate, without pausing the pulling of the uncoated substrate through the coater, when a predetermined length of coated substrate has been pulled, cutting a stationary portion of the coated substrate while the pulling of the portion of the coated substrate is paused, and re-initiating the pulling of the portion of the coated substrate, after the stationary portion of the coated substrate is cut, at a pull speed that is faster than the first pull speed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following description is provided to enable a person of ordinary skill in the art to make and use the invention and sets forth the best modes contemplated by the inventor of carrying out his invention. Various modifications, however, will remain readily apparent to those skilled in the art, since the general principles of the present invention have been defined herein specifically to provide example embodiments.

The present invention provides a system and method that allows for the non-interrupted coating of a pulled substrate with coating materials, even while a coated portion of the substrate is held stationary for cutting. The present invention eliminates waste and improves efficiency and yield. The present invention is particularly applicable to laboratory drawdown coaters. Thus, the present invention will be described in conjunction with laboratory drawdown coaters. However, it should be appreciated that the present invention could be applied to other types of substrate coaters.

Laboratory drawdown coaters are commonly used to apply an even coating onto a substrate. Large rolls of the substrate can be continuously fed through the drawdown coater, potentially resulting in a strip of coated substrate that is hundreds of yards in length. Storage and processing of the coated substrate often requires that the substrate be cut into smaller pieces. However, pausing the coating process to cut the substrate results in lines across the substrate, reducing or destroying its value.

Figure 1:
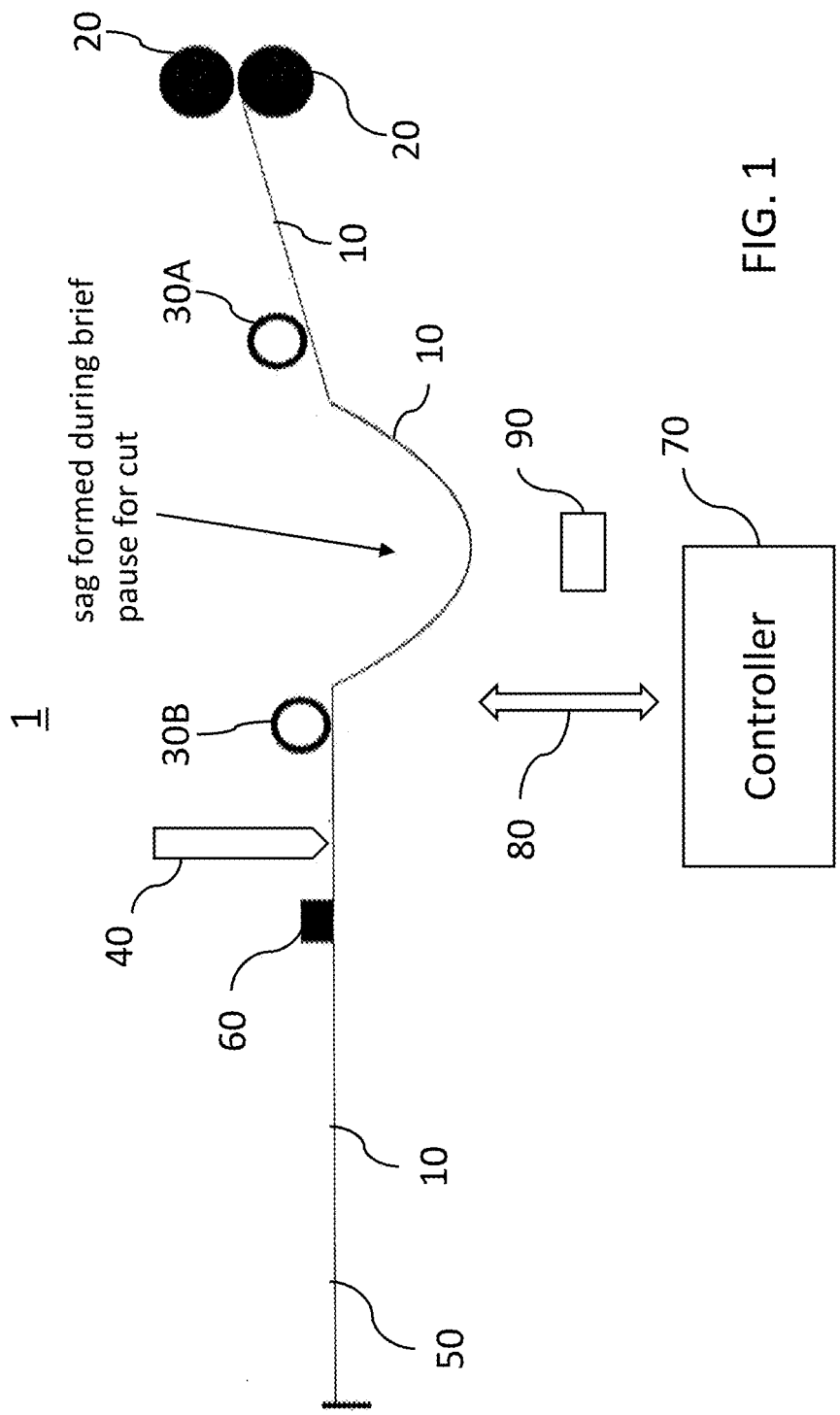
FIG. 1 is a schematic diagram illustrating a device for the continuous pulling of a substrate through the coater gap rollers of a coater, in accordance with one embodiment of the present invention.

FIG. 1 is a schematic diagram illustrating a device 1 for the continuous pulling of a substrate 10, such as, for example, a film and/or paper substrate, through the coater gap rollers 20 of a coater, such as, for example, a laboratory drawdown coater (only coater gap rollers 20 are shown), in accordance with one embodiment of the present invention. The device 1 solves the problem associated with traditional laboratory drawdown coaters by temporarily stopping one portion of the substrate 10 in order to cut the substrate 10, while another portion (the portion being coated) remains in motion.

The device 1 of FIG. 1 preferably employs two electric motor rollers 30A, 30B to pull the substrate 10 through the laboratory drawdown coater and toward a cutter 40. Motor roller 30A contacts the coated substrate 10 exiting the coater gap rollers 20, and pulls the coated substrate 10 in the direction of motor roller 30B. Motor roller 30B pulls the coated substrate 10 toward the cutter 40. Motor rollers 30A and 30B are positioned with a gap between them such that the coated substrate 10 can sag below the pull line.

A stop sensor 50 is preferably positioned down line from the motor rollers 30A and 30B, and the system may optionally include a clamp 60 positioned down line from the motor rollers 30A and 30B. The function of the stop sensor 50 and clamp 60 will described below.

As used herein, down line refers to a direction away from the coater rollers 20. Conversely, up line refers to a direction that is towards the coater rollers 20. The stop sensor 50 activates the clamp 60 and deactivates the motor roller 30B. In one preferred embodiment, the stop sensor 50 comprises a slotted optical switch that detects the leading edge of the substrate 10. Typical slotted optical switches are transmissive optical sensors with photoresistor outputs, are well known in the art and are available commercially.

Figure 2:
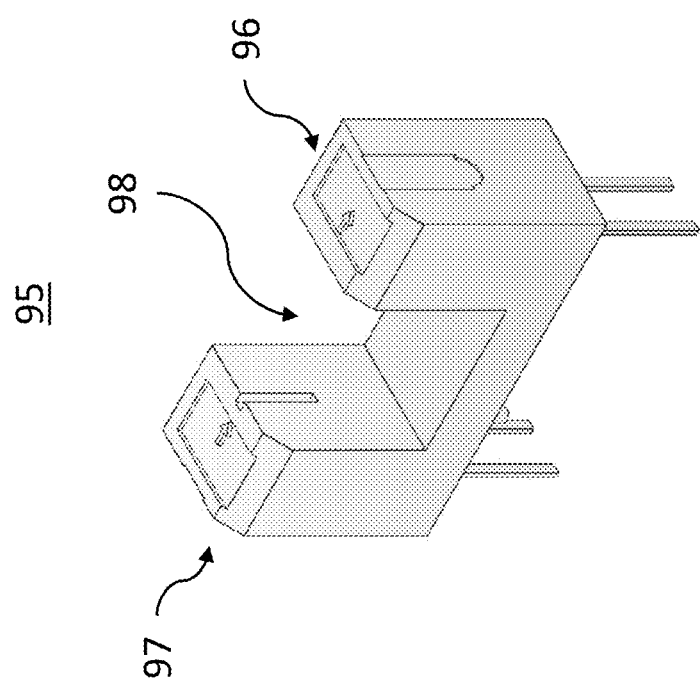
FIG. 2 is a schematic diagram a slotted optical switch.

A schematic diagram of a typical slotted optical switch 95 is shown in FIG. 2. The switch 95 consists of an infrared light emitting diode 96 and a phototransistor 97 mounted on opposite sides of a slot 98. In operation, the light emitting diode 96 emits light that is detected by the phototransistor 97. When an object enters the slot 98, it blocks the light from light emitting diode 96, and thus the output signal of the switch 95 changes. In this way, the presence of an object can be detected.

If the desired length of the cut substrate 10 is 48 inches, then, if a slotted optical switch 95 is used as the stop sensor 50, it should be located 48 inches from the cut line and positioned such that a portion of the leading edge of the substrate will pass through the slot 98 when the substrate reaches the slotted optical switch 95, thereby triggering a change in the signal coming from the slotted optical switch 95. The cut line is where the cutter 40 contacts the substrate 10 when the substrate 10 is being cut. As will be appreciated, distance between the slotted optical switch 95 and the cut line can be varied depending on the desired length of the cut substrate 10. Although a slotted optical switch 95 is a suitable stop sensor 50, any other type of stop sensor 50 can be used that that detects the distance between the leading edge of the substrate 10 and the cutter 40. For example, other types of optical sensors include photo ICs and light convergent reflective sensors.

The device 1 preferably includes a controller 70 in communication with motor rollers 30A and 30B, clamp 60, and stop sensor 50 via connections 80. In operation, the stop sensor 50 sends a signal to the controller 70 when the coated substrate 10 has reached a predetermined position. In response to the signal from the stop sensor 50, the controller 70 sends a signal to motor roller 30B for deactivating motor roller 30B and, if the optional clamp 60 is used, a signal to clamp 60 for activating the clamp 60, resulting in the clamp 60 clamping down on the substrate 10.

The cutter 40 is suitably a manually operated cutter, such as the commercially available Bulman Products Razor-X Cutter. If the cutter 40 is manually operated, then the operator manually and mechanically actuates the cutter 40 after the motor roller 30B has been deactivated and the clamp 60 has been activated (if clamp 60 is used) to cut the substrate 10.

Alternatively, the cutter 40 can be an automated cutter, in which case the controller 70 is preferably in communication with the cutter 40 via a connection 80, and sends a signal to cutter 40, after the motor roller 30B has been deactivated and the clamp 60 has been activated (if clamp 60 is used), that actuates the cutter for cutting the substrate 10.

The portion of the substrate 10 being cut is held stationary by deactivating motor roller 30B and by the optional clamp 60. Thus, the cut can be made with high precision, exactly perpendicular to the direction of motion. The device 1 can also ensure that the pieces of coated substrate 10 are accurately cut to have a desired length, thus eliminating further cutting to length and reducing additional waste. Once the coated substrate 10 is cut, the cut piece is removed to dry, typically by a human operator.

Although the motor roller 30B is deactivated during the cutting of the coated substrate 10, the motor roller 30A remains in continuous motion. Thus, the coated substrate 10 forms a loop or sag in the gap between motor rollers 30A and 30B, as shown in FIG. 1. Because the motor roller 30A continually pulls the substrate 10 through the drawdown coater, no lines are formed due to pauses in the coating process.

Once the cutter 60 has cut the coated substrate 10, the controller 70 resets the stop sensor 50, deactivates the clamp 60 (if used) and reactivates motor roller 30B. The controller 70 preferably controls the speed of motor roller 30B such that the pull speed of motor roller 30B exceeds the pull speed of motor roller 30A until the slack in the substrate 10, caused by stopping motor roller 30B during the cutting process, is removed. Once the slack in the substrate 10 is removed, the controller 70 adjusts the speed of motor rollers 30A and 30B such that the substrate 10 is smoothly pulled without little or no slack in the substrate 10 between motor rollers 30A and 30B (until the next cutting operation is initiated).

The phrase "pull speed" refers to the speed at which the substrate 10 is pulled. For example, if a motor roller has a pull speed of 1 ft./second, it means that 1 foot of substrate is being pulled through that motor roller every second.

The cutter 40 must cut the substrate 10 and the motor roller 30B must be reactivated before the depth of the sag in the substrate 10 (caused by slack in the substrate) reaches a predetermined limit ("sag limit"). The sag limit will depend, at least in part, on the physical dimensions and configuration of the device 1. For example, the device 1 may be configured such that the sag in the substrate 10 would ultimately reach the floor if the motor roller 30B is not reactivated. In this scenario, the sag limit would be set such that the substrate 10 does not touch the floor.

If the cutter 40 is manually operated, the controller 70 can be optionally programmed to slow down the pull speed of motor roller 30A when motor roller 30B is deactivated for a cutting operation. This will give the operator additional time to cut the substrate 10 with the cutter 40 before the depth of the sag in the substrate 10 reaches the sag limit.

Alternatively, an additional proximity sensor 90 (in communication with the controller 70 via connections 80) can be optionally used to detect the depth of the sag in the substrate 10. If such a proximity sensor 90 is used, it would be adapted to send a signal to the controller 70 when the sag in the substrate 10 reaches a predetermined depth. In response to such a signal, the controller 70 would be programmed to slow the pull speed of motor roller 30A to give the operator additional time to cut the substrate 10 with the cutter 40 before the depth of the sag in the substrate 10 reaches the sag limit. Any type of proximity sensor known in the art can be used. For example, the proximity sensor 90 can be a capacitive proximity sensor or a photoelectric proximity sensor.

The cutter 40, clamp 60 and stop sensor 50 can be positioned at any desired distances relative to each other. These distances can be modified based on the desired length of cut coated substrate 10. For example, as discussed above, if the desired length of the cut coated substrate 10 is 48 inches, and the stop sensor 50 is a slotted optical switch 95, then the stop sensor 50 is positioned 48 inches from the cutter 40. If a clamp 60 is not used, then the advancing edge of the substrate 10 is secured manually by an operator prior to cutting. The distance of 48 inches is purely exemplary, and other distances may be used while still falling within the scope of the present invention.

The clamp 60 can be a manually operated clamp or an automated clamp. An example of a commercially available manually operated clamp is a Hold-Down Toggle Clamp manufactured by McMaster Carr. An example of a commercially available automated clamp is an Air-Powered Toggle Clamp manufactured by McMaster Carr.

The distance between the motor rollers 30A and 30B can also be adjusted to account for a variety of factors, including, but not limited to, the firmness of the coated substrate 10, as would be apparent to one of ordinary skill in the art. Similarly, the distance between the motor roller 30B and the cutter 40 can also be adjusted.

The speeds of the motors driving motor rollers 30A and 30B are preferably read by respective digital tachometers. The speed of the respective motor that drives each motor roller is suitably controlled by a potentiometer for each motor, which in turn is preferably controlled by controller 70. Once the appropriate speed is determined for each motor roller 30A/30B, those speeds become the operating standard for properly pulling the substrate 10. The speeds(s) of the motors driving each motor roller 30A/30B can be further adjusted as needed. In a preferred embodiment, once the appropriate speed is determined for each motor roller 30A/30B to properly pull the substrate 10, a master potentiometer can be used to adjust the overall pace of the substrate 10, while the individually set potentiometers in each motor maintains the proper proportional speed between the motor rollers 30A/30B.

The controller 70 is preferably implemented with one or more processors or computers that run one or more specialized programs for implementing the functionality described above. Connections 80 between the controller and motor rollers 30A and 30B, clamp 60, stop sensor 50 and cutter 60 (if an automated cutter is used) can be either a wired connections or wireless connections.

Connections 80 may also be, include or interface to any one or more of, for instance, the Internet, an intranet, a PAN (Personal Area Network), a LAN (Local Area Network), a WAN (Wide Area Network) or a MAN (Metropolitan Area Network), Connections 80 may furthermore be, include or interface to a Bluetooth radio link, or an IEEE 802.11-based radio frequency link (WiFi).

Figure 3:
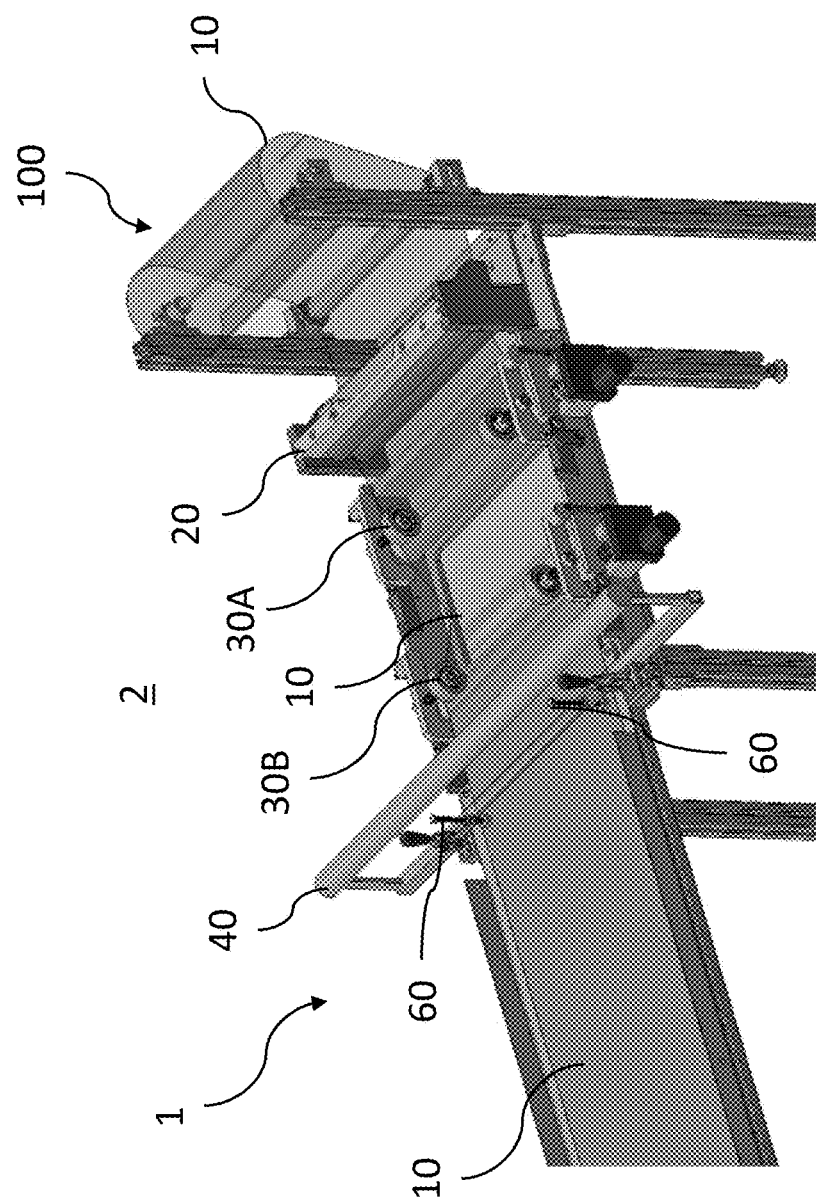
FIG. 3 is a perspective view of a system for coating a substrate, in accordance with one embodiment of the present invention.

FIG. 3 is a perspective view of a system 2 that combines device 1 of the present invention with a laboratory drawdown coater 100, in accordance with one embodiment of the present invention. System 2 allows for a film and/or paper substrate 10 to be pulled through the coater gap rollers 20 of the laboratory drawdown coater 100 by motor roller 30A without interruption while motor roller 30B is paused long enough for the coated substrate 10 to be cut by cutter 60. Details of the operation of device 1 was described above in connection with FIG. 1. Although not shown in FIG. 2, a stop sensor 50, controller 70 and connections 80 are included and used in the manner described above in connection with FIG. 1.

Figure 4:
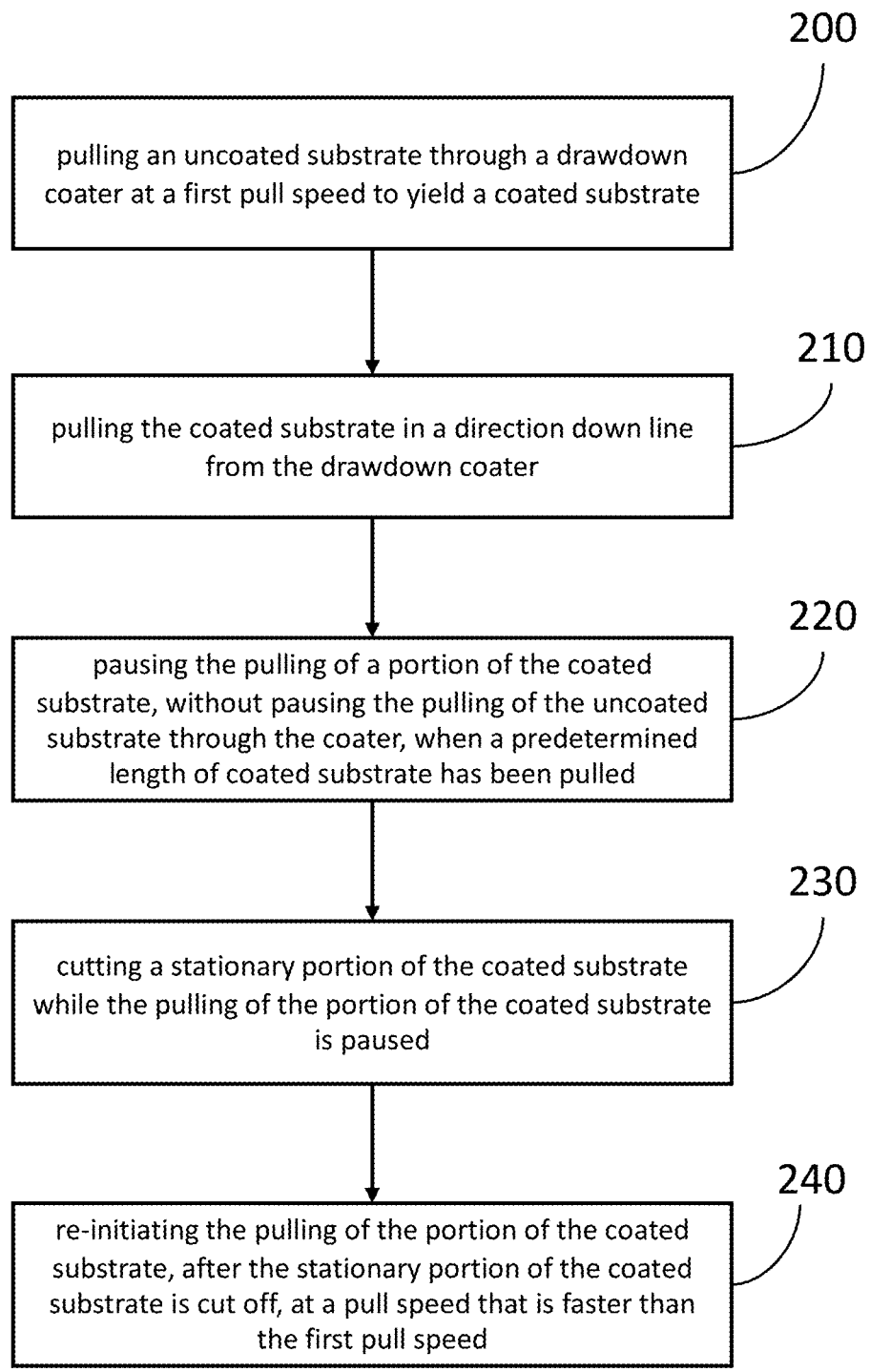
FIG. 4 is a flowchart of steps in a method for continuously pulling a substrate through a coater, in accordance with one embodiment of the present invention.

FIG. 4 is a flowchart of steps in a method for continuously pulling a substrate through a coater, in accordance with one embodiment of the present invention. The method begins at step 200, in which an uncoated substrate is pulled through a drawdown coater at a first pull speed to yield a coated substrate.

Then, at step 210, the coated substrate is pulled in a direction down line from the drawdown coater. At step 220, the pulling of a portion of the coated substrate is paused, without pausing the pulling of the uncoated substrate through the drawdown coater, when a predetermined length of coated substrate has been pulled.

Then, at step 230, a stationary portion of the coated substrate is cut while the pulling of the portion of the coated substrate is paused. At step 240, the pulling of the portion of the coated substrate is re-initiated, after the stationary portion of the coated substrate is cut, at a second pull speed that is faster than the first pull speed.

The foregoing embodiments and advantages are merely exemplary, and are not to be construed as limiting the present invention. The present teaching can be readily applied to other types of apparatuses. For example, although the invention has been described in connection with a laboratory drawdown coater, the present invention can be applied to other types of coaters in which it would be advantageous to not pause the coating of a continuous substrate while an already coated portion of the substrate is cut. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. A device for continuously pulling a substrate through a coater, comprising:
   a first motor roller configured and positioned to pull a substrate through the coater and receive the coated substrate from the coater, wherein the first motor roller is adapted to pull the coated substrate in a direction down line from the first motor roller;
   a second motor roller spaced apart from the first motor roller, and positioned to receive the coated substrate that passed through the first motor roller, wherein the second motor roller is adapted to pull the coated substrate in a direction down line from the second motor roller;
   a stop sensor positioned and adapted to detect when a predetermined length of coated substrate has been pulled by the first and second motor rollers; and
   a controller in communication with the first motor roller, the second motor roller and the stop sensor,
   wherein the controller is configured to stop the second motor roller upon receipt of a signal from the stop sensor indicating that a predetermined length of coated substrate has been pulled by the first and second motor rollers, such that the coated substrate down line from the second motor roller remains stationary for cutting,
   wherein the controller is further configured to control the first motor roller such that the first motor roller continues to pull the substrate through the coater while the second motor roller is stopped, such that the coating of the substrate is not interrupted when the second motor roller is stopped, and
   wherein the controller is further configured to restart the second motor roller after a portion of the coated substrate is cut off.

2. The device of claim 1, further comprising a cutter positioned down line from the first and second motor rollers, wherein the cutter is adapted to cut off a portion of the coated substrate while the second motor roller is stopped.

3. The device of claim 2, wherein the cutter is adapted to be manually operated.

4. The device of claim 2, wherein the cutter is adapted for automated operation, and is in communication with the controller.

5. The device of claim 1, wherein the controller is further configured to, after the portion of the coated substrate has been cut off, adjust the pull speeds of the first and second motor rollers such that the pull speed of the second motor roller is greater than the pull speed of the first motor roller.

6. The device of claim 1, further comprising a clamp, in communication with the controller, positioned down line from the second motor roller.

7. The device of claim 6, wherein the controller is configured to control the clamp such that the clamp clamps down on the coated substrate after the controller stops the second motor roller.

8. The device of claim 1, wherein the controller is configured to reduce a pull speed of the first motor roller when the second motor roller is stopped.

9. The device of claim 1, further comprising a proximity sensor in communication with the controller, wherein the proximity sensor is positioned and adapted to detect when sag in the coated substrate, caused by slack in the coated substrate, between the first and second motor rollers has reached a predetermined value.

10. The device of claim 9, wherein the controller is configured to reduce a pull speed of the first motor roller when the predetermined value is reached.

11. A system for coating a substrate, comprising:
    a laboratory drawdown coater;
    a first motor roller configured and positioned to pull a substrate through the laboratory drawdown coater and receive the coated substrate from the laboratory drawdown coater, wherein the first motor roller is adapted to pull the coated substrate in a direction down line from the first motor roller;
    a second motor roller spaced apart from the first motor roller, and positioned to receive the coated substrate that passed through the first motor roller, wherein the second motor roller is adapted to pull the coated substrate in a direction down line from the second motor roller;
    a stop sensor positioned and adapted to detect when a predetermined length of coated substrate has been pulled by the first and second motor rollers; and
    a controller in communication with the first motor roller, the second motor roller and the stop sensor,
    wherein the controller is configured to stop the second motor roller upon receipt of a signal from the stop sensor indicating that a predetermined length of coated substrate has been pulled by the first and second motor rollers, such that the coated substrate down line from the second motor roller remains stationary for cutting, wherein the controller is further configured to control the first motor roller such that the first motor roller continues to pull the substrate through the laboratory drawdown coater while the second motor roller is stopped, such that the coating of the substrate is not interrupted when the second motor roller is stopped, and wherein the controller is further configured to restart the second motor roller after a portion of the coated substrate is cut off.

12. The system of claim 11, further comprising a cutter positioned down line from the first and second motor rollers, wherein the cutter is adapted to cut off a portion of the coated substrate while the second motor roller is stopped.

13. The system of claim 12, wherein the cutter is adapted to be manually operated.

14. The system of claim 12, wherein the cutter is adapted for automated operation, and is in communication with the controller.

15. The system of claim 11, wherein the controller is further configured to, after the portion of the coated substrate has been cut off, adjust the pull speeds of the first and second motor rollers such that the pull speed of the second motor roller is greater than the pull speed of the first motor roller.

16. The system of claim 11, further comprising a clamp, in communication with the controller, positioned down line from the second motor roller.

17. The system of claim 16, wherein the controller is configured to control the clamp such that the clamp clamps down on the coated substrate after the controller stops the second motor roller.

18. The system of claim 11, wherein the controller is configured to reduce a pull speed of the first motor roller when the second motor roller is stopped.

19. The system of claim 11, further comprising a proximity sensor in communication with the controller, wherein the proximity sensor is positioned and adapted to detect when sag in the coated substrate, caused by slack in the coated substrate, between the first and second motor rollers has reached a predetermined value.

20. The system of claim 19, wherein the controller is configured to reduce a pull speed of the first motor roller when the predetermined value is reached.

21. A method for continuously pulling a substrate through a coater, comprising:

pulling an uncoated substrate through a coater with a first motor roller at a first pull speed to yield a coated substrate;

pulling the coated substrate with a second motor roller in a direction down line from the coater;

pausing the pulling of a portion of the coated substrate, when a predetermined length of coated substrate has been pulled by the second motor roller, by pausing the second motor roller without pausing the pulling of the uncoated substrate through the coater, such that the coating of the substrate is not is not interrupted when the second motor roller is paused;

cutting a stationary portion of the coated substrate while the pulling of the portion of the coated substrate is paused; and re-initiating the pulling of the portion of the coated substrate with the second motor roller, after the stationary portion of the coated substrate is cut, at a pull speed that is faster than the first pull speed.

22. The method of claim 21, wherein the uncoated substrate is pulled through the coater by the first motor roller at a pull speed that is lower than the first pull speed when the pulling of the portion of the coated substrate is paused by pausing the second motor roller.

23. The method of claim 21, wherein the uncoated substrate is pulled through the coater by the first motor roller at a pull speed that is lower than the first pull speed when sag in the coated substrate, caused by slack in the coated substrate, has reached a predetermined value.

24. The method of claim 21, wherein the coater comprises a laboratory drawdown coater.

* * * * *